United States Patent Office 2,693,468
Patented Nov. 2, 1954

2,693,468

OXIDIZED WAX-DERIVED BASIC NITROGEN-CONTAINING COMPOUND AND METHOD OF PREPARING SAME

Charles M. Blair, Jr., Webster Groves, Mo., assignor to Petrolite Corporation, a corporation of Delaware No Drawing. Application February 28, 1952, Serial No. 274,075

15 Claims. (Cl. 260—256.4)

This invention relates to a new class of chemical compounds, namely, certain wax-like and wax-derived compositions containing basic nitrogen groups, and to methods of preparing these compositions.

In its broadest aspect, my invention is concerned with new wax-like basic nitrogen compounds derived by reaction of high molecular weight oxidized waxes, of the kind more fully described below, and certain polyamines. The products will usually consist of a mixture of homologous compounds comprising aminoamides and cyclic amidines, as well as some unreacted wax employed as starting material in the preparation of the oxidized wax reactant, but under the preferred conditions of reaction recited herein will contain substantial amounts of compounds belonging to the general class of cyclic amidines and, in particular, members of the class consisting of substituted imidazolines and tetrahydropyrimidines in which the 2-position carbon of the ring is bonded to a high molecular weight hydrocarbon radical derived from an oxidized wax more completely described below. The large, wax-derived radical attached to the 2-position of the ring will, in general, contain some oxygen-containing group, other than carboxyl, as the result of the oxidation of the wax employed in the synthesis. Such oxygen-containing group may be a hydroxyl group, an oxide group, or a carbonyl group, but in general the amount of oxygen in the 2-substituent will be small in comparison with the total weight of the group; that is, less than 10% of the weight of the group.

The present products find utility in numerous applications as, for example, in automobile polishes, floor polishes, water-proofing agents, lubricants, special greases, anti-stripping agents, corrosion inhibitors, and as chemical intermediates.

The cyclic amidine products of the present invention may be represented by the following structural formula:

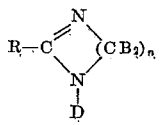

where R is a member of the class consisting of oxidized wax hydrocarbon radicals containing from 35 to 100 carbon atoms, $n$ is the numeral 2 to 3, D is a member of the class consisting of hydrogen and organic radicals containing less than 25 carbon atoms, composed of the element from the group consisting of C, N, O and H, and B is a member of the group consisting of hydrogen and hydrocarbon radicals containing less than 7 carbon atoms, with the proviso that at least three occurrences of B are hydrogen.

The preparation of an imidazoline substituted in the 2-position by lower aliphatic hydrocarbon radicals is well-described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form the wax-like basic nitrogen-containing compounds of the present invention include polyalkylene polyamines such as ethylenediamine, diethylenetriamine, triethylenetetramine, tetraethylenepentamine, and higher polyethylene polyamines, and also including 1,2-diaminopropane, N-ethylethylenediamine, N,N-dibutyldiethylenetriamine, 1,2-diaminobutane, hydroxyethylethylenediamine, 1,2 propylenetriamine, and the like.

For details of the preparation of imidazolines substituted in the 2-position from amines of this type, see the following U. S. patents: U. S. No. 1,999,989 dated April 30, 1935, Max Bockmuhl et al.; U. S. No. 2,155,877, dated April 25, 1939, Edmund Waldmann et al.; and U. S. No. 2,155,878 dated April 25, 1939, Edmund Waldmann et al. Also see Chem. Rev., 32, 47 (43).

Equally suitable for use in preparing compounds of my invention and for the preparation of tetrahydropyrimidines substituted in the 2-position are the polyamines containing at least one primary amino group and at least one secondary amino group, or another primary amino group separated from the first primary amino group by three carbon atoms. This reaction is generally carried out by heating the reactants to a temperature of 230 degrees centigrade or higher, usually within the range of 250 degrees centigrade to 300 degrees centigrade, at which temperatures water is evolved and ring closure is effected. For details of the preparation of tetrahydropyrimidines, see German Patent No. 700,371 dated December 18, 1940, to Edmund Waldmann and August Chwala; German Patent No. 701,322 dated January 14, 1941, to Karl Miescher, Ernst Urech and Willi Klarer; and U. S. Patent No. 2,194,419 dated March 19, 1940, to August Chwala.

Examples of amines suitable for this synthesis include 1,3-propylenediamine, trimethylenediamine, 1,3-diaminobutane, 2,4-diaminopentane, N-ethyl-trimethyl-enediamine, N-aminoethyl-trimethylene diamine, aminopropyl stearylamine, tripropylenetetramine, tetrapropylenepentamine, high boiling polyamines prepared by the condensation of 1,3-propylene dichloride with ammonia, and similar diamines or polyamines in which there occurs at least one primary amino group separated from another primary or secondary amino group by three carbon atoms.

Polyamines suitable as reactants for preparation of the present basic wax-like compounds are characterized by being fairly weak organic bases, as compared to inorganic alkalis, but stronger bases than aromatic amines. Usually they will have ionization constants of the same order of magnitude as ammonia and methylamine, or the like. As hereinbefore stated amine reactants suitable for the present synthesis are characterized by having at least one primary amino group separated from a secondary amino group, or a second primary amino group by at least two but not over three carbon atoms. Amines within this class, which are particularly useful and commercially available, are the polyethylene polyamines, the polypropyleneamines and the polytrimethyl-eneamines.

I have now discovered that valuable wax-like basic nitrogen compounds may be prepared by reacting high molecular weight oxidized waxes containing ester, lactone or carboxylic acid groups with diamines or polyamines of the kind described above. The oxidized waxes suitable for this synthesis are those derived from the so-called microcrystalline waxes obtained by the de-oiling of crude oil tank bottom waxes or waxes occurring in the residua from lubricating oil distillations, and are products generally having saponification values of 20 to 500, acid values of 0 to 400 and which contain from 35 to 100 carbon atoms per molecule. Preferably the oxidized wax reactant has a saponification value of 40 to 160, an acid value of about 10 to 100, and is derived from a hydrocarbon wax containing from 35 to 80 carbon atoms per molecule, on the average. Further, the preferred oxidized wax is derived from a predominantly paraffinic wax or one containing a minimum of cyclic hydrocarbon groups. In some cases, a tank-bottom wax or distillation residue wax may be fractionated by complex formation with urea, by solvent extraction, or by other means to separate a paraffine fraction desirable for oxidation to form oxidized waxes for preparation of the present compounds.

Examples of oxidized waxes suitable for the preparation of the present products are shown below:

OXIDIZED WAX EXAMPLE A 500 grams of a purified hydrocarbon wax, derived from East Texas crude oil and having an average molecular weight of about 870, was placed in a stainless steel reactor equipped with electrically heated jacket, gas inlet tube and outlet. 5 grams of commercial cobalt oleate were added to the wax, the charge was brought to a temperature of 240 degrees Fahrenheit and a slow stream of air was passed through the molten mixture for 24 hours.

The product resulting from this treatment had an acid value of 21, a saponification value of 55, a hydroxyl value of 15, a penetration of 6 mm. (100 grams, 5 seconds), and an N. P. A. color of 6. Chemical analysis indicated an unreacted wax content of about 65%.

OXIDIZED WAX EXAMPLE B

The starting wax for this preparation was derived by de-oiling the residuum from vacuum distillation of an East Texas lubricating oil stock. It had a melting point of 155 degrees Fahrenheit, a penetration of 76 mm. (100 grams, 5 seconds), a color of 3- and a residual oil content of 11.4%. Average molecular weight of this wax was 510, corresponding to about 36 carbon atoms per molecule on the average. 500 grams of this wax were placed in the reaction vessel used in Example A. 3 grams of commercial manganese naphthenate oxidation catalyst were added to the wax and the whole brought to a temperature of 235 degrees Fahrenheit. A slow air stream was passed through the molten wax for 40 hours. The resulting oxidized wax had the following properties:

| | |
|---|---|
| Melting point | 141° F. |
| Penetration (100/5) | 101 mm. |
| Acid value | 74.0 mg. KOH/gm. |
| Saponification value | 160.0 mg. KOH/gm. |
| Hydroxyl value | 14.4 mg. KOH/gm. |
| Color, NPA | 5. |

Chemical analysis of this product indicated that it consists largely of inter- and inner-esters of high molecular weight hydroxy acids, with an unsaponifiable content of about 30%.

OXIDIZED WAX EXAMPLE C 500 grams of a hydrocarbon wax of the kind used in Example A were placed in the reactor of Example A, 6 grams of commercial manganese octoate oxidation catalyst were introduced into the reactor. After bringing the temperature of the wax and catalyst to 250 degrees Fahrenheit, a slow stream of 35% oxygen in nitrogen was passed through the mass for 30 hours. The resulting product had the following properties:

| | |
|---|---|
| Melting point | 185° F. |
| Penetration (100/5) | 8 mm. |
| Acid value | 32 mg. KOH/gm. |
| Saponification value | 90 mg. KOH/gm. |
| Hydroxyl value | 23 mg. KOH/gm. |
| Color, NPA | 8. |

Chemical analysis of this product indicated an unsaponifiable content of about 40%.

I have found that if oxidized waxes of the kinds described in the above examples are heated with polyamines of the kinds described above at temperatures in excess of about 225 degrees centigrade, and preferably in the range of 250 degrees centigrade to 300 degrees centigrade, the carboxyl groups contained in the wax as carboxylic acid or ester groups undergo reaction with the amines to yield cyclic amidines. Such amidines are apparently substituted imidazolines when the polyamine contains the required amino groups separated by two carbon atoms, and tetrahydropyrimidines when the required amino groups are separated by three carbon atoms.

When an acidic reactant as, for example, an oxidized wax having an acid value, is combined with the polyamine, the initial reaction is essentially a salt formation comparable to the formation of an amine oleate. Such compound is characterized by the fact that it can be converted into its original constituent by acidification with a strong mineral acid, such as hydrochloric acid. At a somewhat higher temperature an acylation takes place with the formation of an amide. Amides are characterized by the fact that they can be hydrolized in the presence of an acid to yield the original constituents, i. e., the acid and the amine. At still higher temperatures ring formation takes place, the ring-containing compounds being characterized by the fact that they cannot be split back into the original reactants by the use of either a strong acid or conventional hydrolysis. At still higher temperatures above that required to produce ring compounds, one obtains pyrolysis, reaction products being degraded into smaller molecules.

I have found that if the reaction between the oxidized wax and the poly-alkylene polyamine is conducted at a relatively low temperature, that is, at a temperature between 100 degrees centigrade and 250 degrees centigrade and usually below 230 degrees centigrade, the product obtained consists largely of wax acid amides. Where one or more moles of polyamine are employed in the reaction for each equivalent of carboxyl in the acidized wax, as is generally the case, any amides formed will also contain amino groups. Such amino-amides, while not as stable to hydrolysis and chemical attack as the cyclic amidines, are useful products. Even when the reaction of oxidized wax and polyamine is carried out at temperatures in the preferred range of 230 degrees centigrade to 300 degrees centigrade, some amide may remain in the product. Amide formation is an intermediate step in the reaction to form cyclic amidine and if heating temperatures are low or heating times are short conversion of amide to amidine may be incomplete.

In preparing the products of the present invention, the amount of amino reactant used must always be such that at least two amino groups are employed for every carboxyl group present, either as ester or acid, in the oxidized wax. Further, in general, I will use an amount of oxidized wax such as to provide at least one carboxyl group per mole of polyamine. The amount of carboxyl in the wax may be calculated from the saponification value of the oxidized wax. This value may be determined by refluxing for 2 or 3 hours a sample of the wax with a known quantity of alkali dissolved in a solvent such as n-butanol, which boils above the melting point of the wax, and finally determining by titration with acid, the amount of alkali unused after the refluxing period. The difference is the amount of alkali used in neutralizing carboxylic acid groups and hydrolyzing ester groups, and may be expressed as saponification value, which is defined as the number of milligrams of alkali, expressed as KOH, used up per gram of sample (wax).

When a polyamine reactant such as triethylenetetramine is used, to choose an example, we have available four amino groups per mole. I may, therefore, if I wish, use in preparing the basic nitrogen compounds, up to two carboxyl equivalents of oxidized wax. In general, I will not want to exceed this quantity as it may, under some circumstances, lead to production of progressively increasing amounts of non-amino or non-basic nitrogen-containing constituents in the final product.

The preparation of such products may be illustrated by the following formula for reaction between oxidized wax and diethylenetriamine and which is believed to represent the overall reaction when one mole of polyamine is employed for every equivalent of carboxyl in the oxidized wax. In this case, R.COOR' represents the oxidized wax, R being a hydrocarbon, or, to some extent, a hydroxyhydrocarbon or oxygen-containing hydrocarbon radical derived from the wax, and R' is hydrogen, to the extent that the oxidized wax has an acid value, and is otherwise the residue of an alcohol formed during the oxidation. In some instances, that is where the ester of the wax is an inner ester or lactone. R and R' may be the same residue or group.

Oxidized wax   Diethylenetriamine
ester-acid $$R.CONH.C_2H_4.NH.C_2H_4.NH_2 + R'OH$$
Amino wax amide

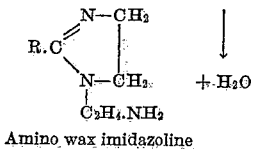

Amino wax imidazoline

Similarly, by reaction of oxidized wax with 1,3-propylenediamine:

Oxidized wax  1,3-pro-              Amino wax amide
ester-acid    pylenediamine

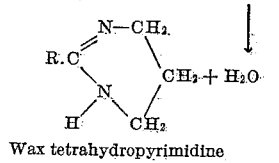

Wax tetrahydropyrimidine

As pointed out above, to the extent that the present products contain cyclic amidine products, such compounds may be represented by the formula type:

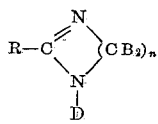

where the symbols have their previous significance.

In these reagents, generally at least three occurrences of B will be hydrogen atoms. In the more common reagents D will be a relatively small organic radical composed of elements from the group consisting of C, N, O and H, and may be a hydrocarbon group, an alkyleneamido group, an alkyleneamino group, a substituted acetyl group, and the like, such as are illustrated in the following examples:

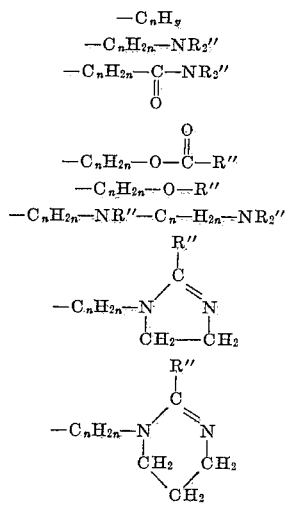

where $n$ is the numeral 1 to 6, and $-C_nH_y$ as a whole represents a hydrocarbon radical containing from 1 to 6 carbon atoms and which may be aliphatic, cycloaliphatic, aromatic, or mixed in character, and where R'' is hydrogen or a hydrocarbon radical containing less than about 20 carbon atoms.

We have found that particularly useful reagents result when the cyclic amidine compound contains basic nitrogen groups in addition to those nitrogen atoms inherent to the ring. In general, compounds of this type are those in which the basic nitrogen group is contained in the radical D in the above formula. Examples of the radical D, where it contains basic nitrogen groups, are as follows:

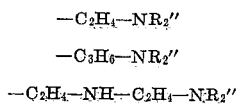

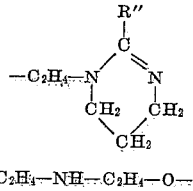

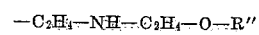

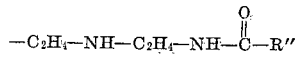

where the symbols have their previous significance.

Particularly useful cyclic amidines are those containing one or more basic nitrogen groups as a portion of the 1-nitrogen substituent of the ring, and are obtained, as illustrated above, by reaction of the oxidized wax with triamines or higher polyamines such as diethylenetriamine, triethylenetetramine, dipropylenetriamine, N-aminoethyl-trimethylenediamine and the like. Where the 1-nitrogen substituent of the ring contains more than one basic nitrogen group amides may be produced by reacting the product with a monocarboxylic acid, for example, a monocarboxylic detergent-forming acid such as a higher fatty acid, a resin acid, a naphthenic acid and the like.

It should be pointed out that where the oxidized wax used as starting material in the present synthesis contains any unreacted wax this will also be in the final product unless steps are taken to separate the hydrocarbon constituents after completion of the reaction. Alternatively, if an oxidized wax product containing unreacted wax is available, this may be purified before reaction by suitable means to remove the wax acids, esters, and lactones from the unreacted hydrocarbon. Such separation of unreacted hydrocarbon in oxidized hydrocarbon constituents can be carried out satisfactorily by a number of procedures, including separation by chromatographic adsorption of the oxidized fraction on alumina or silica gel from a solution of the oxidized wax and a hydrocarbon solvent followed by leeching of the oxidized material from the column by means of a warm solvent for oxygenated compounds. Solvents found suitable for such extraction include ketones, alcohols, ethers, and the like, which boil above about 60 degrees centigrade. Another suitable means for separating unreacted hydrocarbon from the oxidized wax is by means of solvent precipitation of the oxygen-containing fraction from warm propane. Liquid propane, butane or ethane, but particularly liquid propane has the property of dissolving hydrocarbons of the paraffinic type at elevated temperatures, while precipitating from solution more polar constituents of high molecular weight such as oxygenated paraffins, wax acids, wax alcohols, and the like. This property, therefore, makes it possible to separate the unreacted wax from the oxygenated wax simply by making a solution of the total wax product in liquid propane at lower temperatures, that is, in the neighborhood of atmospheric temperatures, then raising the temperature of the solution to about 140 degrees Fahrenheit to 180 degrees Fahrenheit, at which point a lower layer of oxygenated wax containing some liquid propane is separated. The hydrocarbon may be drawn off or decanted by suitable mechanical means from the precipitated layer of oxygenated wax, after which this latter layer may be warmed to dispel propane.

While I have described the products of the present invention as co-generic mixtures of wax-like basic nitrogen-containing compounds, and while I have shown above that these compounds can be prepared in the absence of unreactive hydrocarbon wax, either by suitable separation of unoxidized wax from oxidized wax constituents in the original reactants, or by separation of unoxidized wax from the final product, I wish to emphasize that I have not found it possible to separate the co-generic mixture into the constituent basic nitrogen-containing compounds. Although as previously pointed out, the products of the present invention contain a mixture of basic nitrogen-containing compounds, and particularly constituents from the classes of amino-amides and amino-heterocyclic compounds with and without additional amino groups contained therein, I have found it impractical, if not impossible, to separate these constituents on either a laboratory or commercial scale. The product of reaction is, therefore, a co-generic mixture.

The following details of preparation of wax-like basic nitrogen-containing compounds from oxidized waxes will illustrate the kinds of compositions contemplated herein.

Example 1

1020 grams of the oxidized wax of Example A and 103 grams of diethylenetriamine were placed in a three-neck glass reactor equipped with heater, stirrer, thermometer and reflux condenser above a distillate trap. This mixture was heated and stirred for 4 hours at 275 degrees centigrade, in which period water evolution practically ceased. 42.4 grams of aqueous distillate were collected, of which 17 grams were amine, as determined by analysis. The product had the following properties:

Melting point _____ 187° F.
Penetration (100/5) _____ 7 mm.
Color _____ Brown.
Neutralization equivalent (by electrometric titration to pH 4.5) _____ 660.

Partly soluble in warm 0.1N sulfuric acid and warm 0.1N acetic acid.

Example 2

624 grams of the oxidized wax of Example C were substituted for the oxidized wax in Example 1. 38 grams of distillate were collected of which 12 grams were amine. The wax amidine product had the following properties:

Melting point _____ 186° F.
Penetration (100/5) _____ 13 mm.
Viscosity at 210° F _____ 152 SSU.
Neutralization equivalent (by electrometric titration to pH 4.5) _____ 483.

This product is miscible in all proportions with molten carnauba wax.

Example 3

146 grams of triethylenetetramine were substituted for the diethylenetriamine of Example 2. 32 grams of aqueous distillate were collected of which about 8 grams were amine. Some ammonia was also evolved, presumably as the result of some thermal decomposition of the triethylenetetramine. The product had the following properties:

Melting point _____ 185° F.
Penetration (100/5) _____ 18 mm.
Viscosity at 210° F _____ 178 SSU.
Neutralization equivalent (by electrometric titration to pH 4.5) _____ 622.
Nitrogen _____ 4.88.

Example 4

284 grams of stearic acid were added to the product of Example 3. The mixture was heated to 200 degrees centigrade, in the apparatus previously employed, while a slow stream of nitrogen gas was passed through the molten mass. After 3.5 hours' heating, 17 ml. of water had collected in the trap. The product presumably contained a substantial proportion of material of the general formula:

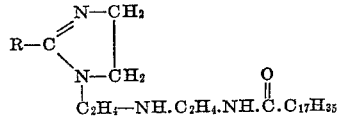

where R represents the oxidized wax radicals originally bonded to the carboxyl groups of the oxidized wax.

Example 5

184 grams of 2,4-diamino,2-methyl, 4-cyclohexylbutane were substituted for the diethylenetriamine of Example 1.

Example 6

350 grams of the oxidized wax of Example B and 131 grams of aminopropyltrimethylenediamine were reacted by the procedure of Example 1. The resulting product had the following properties:

Melting point _____ °F__ 148
Penetration (100/5) _____ mm__ 30
Neutralization equivalent (by electrometric titration to pH 4.5) _____ 320

Example 7

350 grams of the oxidized wax of Example B and 200 grams of polyamine H were reacted by the procedure of Example 1. Polyamine H is a high molecular weight (about 200 to 300) polyethylene polyamine and represents the residue from the distillation of polyethylene polyamines prepared by the reaction of ethylene dichloride and ammonia and is obtained by the distillation of tetraethylene pentamine and lower boiling amines from the reaction product. The non-distilled portion is commercially known as polyamine H and contains about 31% nitrogen. The product resulting from this reaction has the following properties:

Melting point _____ °F__ 151
Penetration (100/5) _____ mm__ 31
Neutralization equivalent (by electrometric titration to pH 4.5) _____ 235

Example 8

350 grams of the oxidized wax of Example B and 146 grams of triethylene tetramine were reacted by the procedure of Example 1. The resulting product had the following properties:

Melting point _____ °F__ 155
Penetration (100/5) _____ mm__ 45
Neutralization equivalent (by electrometric titration to pH 4.5) _____ 340

Example 9

The wax-like amines prepared from oxidized waxes such as those of Examples A, B and C will, in general, contain some unreacted hydrocarbon which originally accompanied the oxidized wax. In such cases, this impurity may be reduced in percentage or removed by suitable chemical or physical methods. As an example of such a separation, 100 grams of the wax amine of Example 3 were dispersed in 4000 milliliters of acetone by warming to about the boiling point. This dispersion was then chilled to 100 degrees Fahrenheit and filtered at this temperature to remove the precipitated wax. The filtrate was evaporated to remove the solvent, and on examination was found to have the following properties:

Yield _____ 40%.
Neutralization equivalent _____ 326.
Percent nitrogen _____ 8.28%.
M. P. (ASTM) _____ 149.8° F.
Penetration (100/5) _____ Too soft for needle.

Although I have described the present reagents as wax-like basic nitrogen-containing compounds, I may, in many instances, employ these compounds in the form of their salts, either with organic or inorganic acids. Being relatively strong bases, the amidines readily form such salts, and where the reagent contains basic groups in addition to the ring nitrogen atoms, they may form di- or polysalts. Examples of acids which may be used to form such salts are hydrochloric acid, sulfuric acid, acetic acid, glycolic acid, oxalic acid, maleic acid, oleic acid, abietic acid, phosphoric acid, petroleum sulphonic acid, naphthenic acid, rosin, phenylacetic acid, benzoic acid, and the like.

The present products find particular utility in the manufacture of polishes, and are especially useful in the preparation of hydrocarbon-suspension type polishes of the kind commonly applied to automobiles and other lacquered or enamelled surfaces. Polishes of this type are commonly prepared from oxidized waxes such as that of Example A, and various silicones in admixture with a volatile hydrocarbon such as Stoddard solvent, mineral spirits or similar. Such waxes are characterized by relatively easy application and permanence, but suffer from the fact that the wax content of the mixture undergoes sedimentation in the polish container to form a compact layer which is difficult to redisperse by shaking or other means.

Polishes prepared from the oxidized wax-derived cyclic amidines of the present invention show a much less compact sedimentation layer and are readily made homogeneous by gentle agitation. They also show improved adhesion to most polar surfaces such as paints, enamels, lacquer and metals.

A polish was prepared as follows: To 50 ml. of Stoddard solvent was added 2.7 grams of the product of Example 1, 1.3 grams of Dow-Corning 200 fluid (350 c. s. viscosity) and 0.16 gram of glacial acetic acid. The mixture was warmed and stirred until all constituents were in solution. 50 ml. of cold Stoddard solvent were then added rapidly with stirring after removing the heating source. The product was a light tan suspension. When this preparation was applied to an automobile panel and the solvent allowed to evaporate, the remaining film was easily rubbed out with a soft cloth to give a high gloss, water-repellant film.

A product similar to the above was prepared using a polyethyl silicone manufactured by the Linde Air Products Division of the Union Carbide and Carbon Co., and which had a viscosity of 3000 centistokes at 25 degrees centigrade. This silicone was used in place of the Dow-Corning 200 fluid in the above formulation and gave a product having a very easy rub-out to form a brilliant gloss. This film had the added advantage of being harmless to paint which might be applied over it.

A sample of the above polish was stored in a glass container for 3 months. After this period a loosely packed, sedimentation layer was formed, occupying the lower 20% of the mixture volume. This layer was easily redispersed by gentle shaking, and remained dispersed for an extended period. A similar polish, made in exactly the same manner, but employing 2.7 grams of oxidized wax of Example A in place of the product of Example 1 and the acetic acid, was prepared, also. After 3 months' storage, a tightly packed sedimentation layer was formed occupying only 8% of the mixture volume. This layer could be redispersed only by vigorous shaking, and reformed rapidly when shaking ceased.

In addition, the stripping or removal of asphalt, bitumen or the like from mineral aggregate by water is materially inhibited by the use of the aforesaid oxidized wax-derived compounds, such materials improving the adhesion of the asphalt or bitumen to the mineral aggregate. The anti-stripping action of asphalt additives is frequently determined as follows:

To 100 grams of mineral aggregate contained in a one-pint bottle is added 2 grams of water. The bottle is closed and rotated on rolls for about 15 minutes to assure distribution of the water on the aggregate. To the wet aggregate is added 4 grams of asphalt and the mixture is again rotated on the rolls for 30 minutes. After this time the aggregate is examined for extent of coating with the asphalt. 200 mls. of distilled water are then placed in a bottle and it is rolled for one hour. The bottle is then removed, the fluids decanted therefrom, and the aggregate placed on a filter paper and allowed to dry. The percent of uncovered surface is determined by visual estimate. Asphalt anti-strippers, when tested, are added to the asphalt in various concentrations usually within the range of ¼ of 1% to 2% or 3% and this asphalt is given the same test as above.

A product of Example 8 above was added in the concentration of ½ of 1% and 1% to samples of MC-5 asphalts. These samples were tested by the above method on a siliceous aggregate and compared with the action of MC-5 asphalt without any additive. The following results were obtained. The blank showed 100% stripping of the asphalt, the ½ of 1% solution of the product of Example 8 in the asphalt showed only 40% stripping, and the 1% of the product of Example 8 in the asphalt showed less than 10% stripping.

Some of the present products have the property of preventing corrosion, particularly corrosion resulting from exposure to organic acids, acidic gases such as $H_2S$ and $CO_2$, or dilute mineral acids such as HCl, $H_2SO_4$ and the like. Severe corrosion of this type occurs in the petroleum industry, particularly in oil and gas production and in the refining of certain oils.

As an example of the use of these materials as corrosion inhibitors in petroleum oil systems, experiments were made to determine the corrosion inhibiting power of the product of Example 3. The laboratory procedure for the evaluation of organic corrosion inhibitors for the prevention of corrosion in wells producing petroleum or mixtures of crude petroleum oils and brine are generally run as follows:

Tall form beakers containing a mixture of hydrocarbon oil and brine and the inhibitor to be tested are placed in an apparatus in which they can be kept under a controlled atmosphere at an elevated temperature and in which weighed steel test coupons can be immersed in the mixture of liquids and used as stirring paddles to agitate the two liquids together. In the apparatus used for the present tests, the total volume of liquids used in each beaker was 345 mls. of which 20% was mineral spirits and 80% was a brine containing 2% sodium chloride, 0.2% sodium sulphate, 0.4% magnesium chloride hexahydrate, and 0.4% calcium chloride. The product of Example 3 was added to each of three different beakers containing this mixture and in concentrations sufficient to give 29 p. p. m. in the first beaker, 58 p. p. m. in the second beaker, and 116 parts in the third beaker. Actually, a fourth beaker was used as a control since no inhibitor was added to this container. These beakers were kept in an atmosphere of 25% hydrogen sulphide and 75% nitrogen while being stirred with paddles consisting of two weighed steel test coupons insulated from one another by a plastic insulator and held by a plastic chuck attached to the rotating portion of the stirrer. The test apparatus was kept in a room held at 110 degrees Fahrenheit and the test was allowed to continue for 72 hours, after which the gases were flushed out with nitrogen and the apparatus was opened. The steel test coupons used as stirrers were removed, cleaned by dipping in inhibited hydrochloric acid, washed with a mild soap, dried and then weighed. From the weight losses of the coupons, which were all identical, the percent protection imparted by product of Example 3 was calculated and found to be as follows:

| Concentration of Product of Example 3 | Percent Protection Obtained |
|---|---|
| 29 p. p. m. | 46 |
| 58 p. p. m. | 57 |
| 116 p. p. m. | 90 |

In comparison to these results a widely used organic corrosion inhibitor at the same concentrations and under exactly the same test conditions gave the following percentage protection for 29 p. p. m., 58 p. p. m., and 116 p. p. m., respectively: 27%, 66% and 74%.

While there have been described what are at present considered preferred embodiments of the present invention, it will be apparent to those skilled in the art that various modifications and changes may be made without departing from the essence of the invention, and it is intended to cover herein all such modifications and changes as come within the true scope and spirit of the appended claims.

I claim:

1. The process of producing a co-generic mixture consisting substantially of wax-like basic nitrogen-containing compounds derived by reaction between (A) oxidized hydrocarbon wax having a saponification value of 20 to 500; an acid value of 0 to 400 and having 35 to 100 carbon atoms per molecule and (B) a polyamine selected from the class consisting of (a) polyamines containing at least one primary amino group and at least one secondary amino group separated from said primary amino group by not less than two carbon atoms and not more than three carbon atoms and (b) polyamines containing at least one first primary amino group and at least one second primary amino group separated from said first primary amino group by not less than two carbon atoms and not more than three acrbon atoms; the ratio of reactants being at least one carboxyl equivalent of (A) to one mole of (B) and said reaction being conducted at a temperature at least sufficiently high to produce acylation and below the pyrolytic point, said temperature being within the range from 100 to 300 degrees centigrade.

2. The process of producing a co-generic mixture consisting substantially of wax-like basic nitrogen-containing compounds derived by reaction between (A) oxidized hydrocarbon wax having a saponification value of 20 to 500; an acid value of 0 to 400 and having 35 to 100 carbon atoms per molecule and (B) a polyamine selected from the class consisting of (a) polyamines containing at least one primary amino group and at least one secondary amino group separated from said primary amino group by not less than two carbon atoms and not more than three carbon atoms and (b) polyamines containing at least one first primary amino group and at least one second primary amino group separated from said first primary amino group by not less than two carbon atoms and not more than three carbon atoms; the ratio of reactants being at least one carboxyl equivalent of (A) to one mole of (B) and said reaction being conducted at a temperature at least sufficiently high to produce acylation and below the pyrolytic point, said temperature being within the range from 230 to 300 degrees centigrade.

3. The process of producing a co-generic mixture consisting substantially of wax-like basic nitrogen-containing compounds derived by reaction between (A) oxidized hydrocarbon wax having a saponification value of 20 to 500; an acid value of 0 to 400 and having 35 to 100 carbon atoms per molecule and (B) a polyamine selected from the class consisting of (a) polyamines containing at least one primary amino group and at least one secondary amino group separated from said primary amino group by not less than two carbon atoms and not more than three carbon atoms and (b) polyamines containing at least one first primary amino group and at least one second primary amino group separated from said first primary amino group by not less than two carbon atoms and not more than three carbon atoms; the ratio of reactants being at least one carboxyl equivalent of (A) to one mole of (B) and said reaction being conducted at a temperature at least sufficiently high to produce acylation and below the pyrolytic point, said temperature being within the range from 230 to 300 degrees centigrade, said reaction involving essentially ring formation.

4. The process of producing a co-generic mixture consisting substantially of wax-like basic nitrogen-containing compounds derived by reaction between (A) ovidized hydrocarbon wax having a saponification value of 40 to 160; an acid value of 10 to 100 and having 35 to 100 carbon atoms per molecule and (B) a polyamine selected from the class consisting of (a) polyamines containing at least one primary amino group and at least one secondary amino group separated from said primary amino group by not less than two carbon atoms and not more than three carbon atoms and (b) polyamines containing at least one first primary amino group and at least one second primary amino group separated from said first primary amino group by not less than two carbon atoms and not more than three carbon atoms; the ratio of reactants being at least one carboxyl equivalent of (A) to one mole of (B) and said reaction being conducted at a temperature at least sufficiently high to produce acylation and below the pyrolytic point, said temperature being within the range from 230 to 300 degrees centigrade, said reaction involving essentially ring formation.

5. The process of producing a co-generic mixture consisting substantially of wax-like basic nitrogen-containing compounds derived by reaction between (A) oxidized hydrocarbon wax having a saponification value of 40 to 160; an acid value of 10 to 100 and having 35 to 80 carbon atoms per molecule and (B) a polyamine selected from the class consisting of (a) polyamines containing at least one primary amino group and at least one secondary amino group separated from said primary amino group by not less than two carbon atoms and not more than three carbon atoms and (b) polyamines containing at least one first primary amino group and at least one second primary amino group separated from said first primary amino group by not less than two carbon atoms and not more than three carbon atoms; the ratio of reactants being at least one carboxyl equivalent of (A) to one mole of (B) and said reaction being conducted at a temperature at least sufficiently high to produce acylation and below the pyrolytic point, said temperature being within the range from 230 to 300 degrees centigrade, said reaction involving essentially ring formation.

6. The process of producing a co-generic mixture consisting substantially of wax-like basic nitrogen-containing compounds derived by reaction between (A) oxidized hydrocarbon wax having a saponification value of 40 to 160; an acid value of 10 to 100 and having 35 to 80 carbon atoms per molecule and (B) a polyamine selected from the class consisting of polyethyleneamines, polypropyleneamines and polytrimethyleneamines; the ratio of reactants being at least one carboxyl equivalent of (A) to one mole of (B) and said reaction being conducted at a temperature at least sufficiently high to produce acylation and below the pyrolytic point, said temperature being within the range from 230 to 300 degrees centigrade, said reaction involving essentially ring formation.

7. The co-generic mixture obtained in the process defined in claim 1.

8. A heterocyclic, organic compound of the formula:

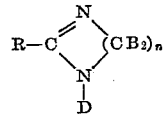

where R is a member of the class consisting of oxidized wax hydrocarbon radicals containing 35 to 80 carbon atoms; B is a member of the group consisting of hydrogen and alkyl and cycloalkyl radicals containing less than 7 carbon atoms, with the proviso that at least three occurrences of B are hydrogen; $n$ is the numeral 2 to 3; and D is a member of the group consisting of hydrogen, a lower alkyl radical, $-C_nH_{2n}NR'_2$,

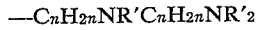

and

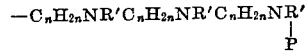

where $n$ is the numeral 1 to 6, R' is a member of the group consisting of hydrogen and a lower alkyl radical and P is the acyl radical of a monocarboxylic acid of the group consisting of higher fatty acids, resin acids and naphthenic acids.

9. A heterocyclic, organic compound of the formula:

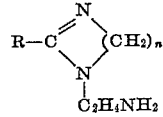

where R is a member of the class consisting of oxidized wax hydrocarbon radicals containing 35 to 80 carbon atoms; and $n$ is the numeral 2 to 3.

10. A heterocyclic, organic compound of the formula:

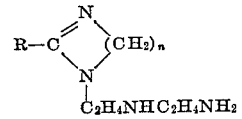

where R is a member of the class consisting of oxidized wax hydrocarbon radicals containing 35 to 80 carbon atoms; and $n$ is the numeral 2 to 3.

11. A heterocyclic, organic compound of the formula:

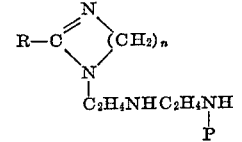

where R is a member of the class consisting of oxidized wax hydrocarbon radicals containing 35 to 80 carbon atoms; $n$ is the numeral 2 to 3; and P is the acyl radical of a monocarboxylic acid from the group consisting of higher fatty acids, resin acids and naphthenic acids.

12. A heterocyclic, organic compound of the formula:

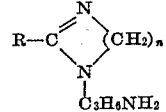

where R is a member of the class consisting of oxidized wax hydrocarbon radicals containing 35 to 80 carbon atoms; and $n$ is the numeral 2 to 3.

13. A heterocyclic, organic compound of the formula:

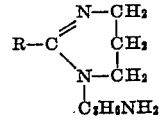

where R is a member of the class consisting of oxidized wax hydrocarbon radicals containing 35 to 80 carbon atoms.

14. A heterocyclic, organic compound of the formula:

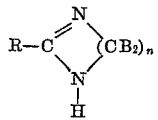

where R is a member of the class consisting of oxidized wax hydrocarbon radicals containing 35 to 80 carbon atoms; $n$ is the numeral 2 to 3; and B is a member of the group consisting of hydrogen and alkyl and cycloalkyl radicals containing less than 7 carbon atoms, with the proviso that at least three occurrences of B are hydrogen and at least one occurrence of B is a cyclohexyl radical.

15. A heterocyclic, organic compound of the formula:

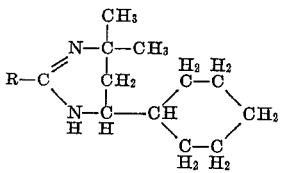

where R is a member of the class consisting of oxidized wax hydrocarbon radicals containing 35 to 80 carbon atoms.

References Cited in the file of this patent

FOREIGN PATENTS

| Number | Country | Date |
| --- | --- | --- |
| 704,410 | Germany | Mar. 29, 1941 |